United States Patent
Asai et al.

(10) Patent No.: US 7,216,151 B2
(45) Date of Patent: May 8, 2007

(54) COMPUTER APPARATUS AND PROGRAM FOR CONTROLLING SAME

(75) Inventors: Arito Asai, Asaka (JP); Kazuto Washio, Asaka (JP)

(73) Assignee: Fujifilm Corporation, Tokyo (JP)

( * ) Notice: Subject to any disclaimer, the term of this patent is extended or adjusted under 35 U.S.C. 154(b) by 828 days.

(21) Appl. No.: 10/354,123

(22) Filed: Jan. 30, 2003

(65) Prior Publication Data

US 2003/0145063 A1 Jul. 31, 2003

(30) Foreign Application Priority Data

Jan. 30, 2002 (JP) .............................. 2002-020899

(51) Int. Cl.
*G06F 15/173* (2006.01)
(52) U.S. Cl. ..................................... 709/217
(58) Field of Classification Search ................ 709/217, 709/208, 203, 223
See application file for complete search history.

(56) References Cited

U.S. PATENT DOCUMENTS

| | | | |
|---|---|---|---|
| 6,757,684 B2 * | 6/2004 | Svendsen et al. ............. | 707/10 |
| 6,829,619 B1 * | 12/2004 | Wakamatsu et al. ...... | 707/104.1 |
| 6,901,378 B1 * | 5/2005 | Linker et al. ................. | 705/27 |
| 6,954,767 B1 * | 10/2005 | Kanada ....................... | 707/204 |

FOREIGN PATENT DOCUMENTS

| | | |
|---|---|---|
| JP | 8-84157 A | 3/1996 |
| JP | 8-95992 A | 4/1996 |
| JP | 2000-250918 A | 9/2000 |

* cited by examiner

*Primary Examiner*—David Y. Eng
(74) *Attorney, Agent, or Firm*—Birch, Stewart, Kolasch & Birch, LLP

(57) ABSTRACT

A search that is efficient and lightens the load on servers is conducted. An original program list containing IP addresses of a number of servers is stored in a center server. The center server supplies the original server list to a client computer, which proceeds to divide the list into a plurality of divided server lists. The divided server lists, together with a search command, are applied to respective ones of master servers. The master servers further divide the divided server lists into subdivided server lists, and each master server transmits the subdivided server lists, together with the search command, to respective ones of slave servers. These operations of dividing the server list and transmitting the divided server lists to subsequent servers are repeated. A search is conducted by the master and slave servers in accordance with the search command, data representing the search results are sent back to a transmit-source server and this server supplies the data to the client computer.

3 Claims, 7 Drawing Sheets

| IMAGE | | ATTRIBUTE INFORMATION | |
|---|---|---|---|
| ORIGINAL IMAGE | THUMBNAIL IMAGE | CATEGORY | DATE OF PHOTOGRAPHY |
|  |  | FAMILY | 2001. 8. 30 |
|  |  | IN LOVE | 2001. 10. 24 |
| ⋮ | | ⋮ | ⋮ |
|  |  | AUTOMOBILE | 2001. 11. 6 |

ORIGINAL SERVER LIST

| IDENTIFICATION NO. | IP ADDRESS | TCP PORT NO. |
|---:|---|---:|
| 1 | 192.168.0.1 | 80 |
| 2 | 192.168.0.2 | 80 |
| 3 | 192.168.0.3 | 80 |
| ⋮ | ⋮ | ⋮ |
| 1001 | 192.168.10.1 | 80 |

DIVIDED SERVER LISTS

| IDENTIFICATION NO. | IP ADDRESS | TCP PORT NO. |
|---|---|---|
| 1 | 192.168.0.1 | 80 |
| 11 | 192.168.0.11 | 80 |
| 21 | 192.168.0.21 | 80 |
| .... | .... | .... |
| 1001 | 192.168.10.1 | 80 |

111

| IDENTIFICATION NO. | IP ADDRESS | TCP PORT NO. |
|---|---|---|
| 2 | 192.168.0.2 | 80 |
| 12 | 192.168.0.12 | 80 |
| 22 | 192.168.0.22 | 80 |
| .... | .... | .... |
| 992 | 192.168.9.92 | 80 |

112

| IDENTIFICATION NO. | IP ADDRESS | TCP PORT NO. |
|---|---|---|
| 3 | 192.168.0.3 | 80 |
| 13 | 192.168.0.13 | 80 |
| 23 | 192.168.0.23 | 80 |
| .... | .... | .... |
| 993 | 192.168.9.93 | 80 |

113

| IDENTIFICATION NO. | IP ADDRESS | TCP PORT NO. |
|---|---|---|
| 10 | 192.168.0.0 | 80 |
| 20 | 192.168.0.10 | 80 |
| 30 | 192.168.0.20 | 80 |
| .... | .... | .... |
| 1000 | 192.168.9.90 | 80 |

COMPUTER APPARATUS AND PROGRAM FOR CONTROLLING SAME

BACKGROUND OF THE INVENTION

1. Field of the Invention

This invention relates to a computer apparatus and to a program for controlling the computer apparatus.

2. Description of the Related Art

When an image search is conducted, an image search command is transmitted from a client computer to a server computer in a client-server model. The server computer executes processing in accordance with the command and transmits data indicative of the result of processing to the client computer. In order to execute processing in accordance with the image search command in a plurality of server computers, the client computer must transmit the command to all of these server computers. This subjects the client computer to a heavy load.

There are systems in which a center server is provided and a list of all image data that has been stored in all content servers connectable to the center server is stored in the center server. By transmitting an image search command from a client computer to the center server, a search of images that have been stored in the content servers is conducted by the center server. However, since the entirety of the search is conducted by the center server, the center server is subjected to a heavy load.

Furthermore, in a peer-to-peer model, an image search command transmitted from a client computer is received by a content server, which proceeds to conduct the image search. The image search command is transferred from the content server that received the command to another content server, where the image search is conducted again. However, since there are instances where the command will not be distributed to a large number of content servers, an efficient search may not be conducted.

SUMMARY OF THE INVENTION

Accordingly, an object of the present invention is to conduct a search that is efficient and that will not impose a heavy load when conducted.

According to a first aspect of the present invention, the foregoing object is attained by providing a computer apparatus comprising a first receiving device for receiving an original address list transmitted from a center server and containing addresses of a number of computers; a dividing device (dividing means) for dividing up the original address list, which has been received by the first receiving device, into divided address lists corresponding to respective ones of a plurality of computers; a first transmitting device for transmitting a divided address list obtained by the dividing unit as well as a search command to a transmit-destination computer specified by an address contained in this divided address list; and a second receiving device for receiving data representing result of execution of search processing by the transmit-destination computer in accordance with the search command.

The present invention according to the first aspect thereof provides also a control method suited to the above-described computer apparatus. Specifically, the method comprises the steps of receiving an original address list transmitted from a center server and containing addresses of a number of computers; dividing up the received original address list into divided address lists corresponding to respective ones of a plurality of computers; transmitting a divided address list and a search command to a transmit-destination computer specified by an address contained in this divided address list; and receiving data representing result of execution of search processing in accordance with the search command.

A program for controlling the above-described computer apparatus, and a recording medium on which the program has been stored may be provided.

In accordance with the first aspect of the present invention, an original address list is stored in a center server and the original address list is transmitted from the center server to a computer apparatus.

The computer apparatus receives the original address list and divides up the original address list into divided address lists corresponding to respective ones of a plurality of computers. Each computer specified by an address contained in each divided address list is transmitted the corresponding divided address list and a command in associated fashion.

Search processing is executed in accordance with the command in all of the transmit-destination computers. Data representing the results of execution of search processing is sent back from the transmit-destination computers to the original computer apparatus that transmitted the command.

The source computer apparatus receives data representing results of execution of search processing sent back from all of the transmit-destination computers. When this occurs, the source computer apparatus ascertains the results of execution of search processing by all of the transmit-destination computers. Since the source computer apparatus can tell from the results of execution of search processing which transmit-destination computer should be accessed to enable execution of processing in accordance with a command, the computer apparatus can transmit an execute command to the desired computer. As a result, processing in accordance with the execute command can be executed comparatively efficiently.

According to a second aspect of the present invention, the foregoing object is attained by providing a computer apparatus comprising a first receiving device for receiving an address list, which contains addresses of respective ones of a number of computers, and a search command, the address list and command being provided by a transmit-source computer; a dividing device for dividing up the original address list, which has been received by the first receiving device, into divided address lists corresponding to respective ones of a plurality of computers; a first transmitting device for transmitting a divided address list obtained by the dividing unit as well as a search command to a transmit-destination computer specified by an address contained in this divided address list; a search device for conducting a search in accordance with a search command received by the first transmitting device; a second receiving device for receiving data representing result of execution of search processing by the transmit-destination computer in accordance with the search command; and a second transmitting device for transmitting, to the transmit-source computer, data representing result of execution of search processing by the search device and data representing result of execution of search processing received by the second receiving device.

The present invention according to the second aspect thereof provides also a control method suited to the above-described computer apparatus. Specifically, the method comprises the steps of receiving an address list, which contains addresses of respective ones of a number of computers, and a search command, the address list and command being provided by a transmit-source computer; dividing up the received address list into divided address lists corresponding to respective ones of a plurality of computers; transmitting a divided address list and the received search command to a transmit-destination computer contained in the divided address list; conducting a search in accordance with a received search command; receiving data representing results of execution of search processing by the transmit-destination computer in accordance with the search command; and transmitting, to the transmit-source computer, data representing result of execution of search processing and data representing received result of execution of search processing.

The present invention according to the second aspect thereof provides also a program for controlling the above-described computer apparatus as well as a recording medium storing the program.

In accordance with the second aspect of the present invention, an address list and a search command is received, and the received address list is divided into address lists corresponding to respective ones of a plurality of computers. The divided address lists are transmitted (in association with a search command) to transmit-destination computers. The transmit-destination computers execute search processing based upon the search command received, and data representing the results of executed search processing are sent back to the transmit-source computer.

Further, the transmit-destination computers further subdivide the divided address list. The subdivided address lists are transmitted to the succeeding transmit-destination computers together with the search command. Thus, a divided address list is subdivided and the subdivided addresses lists are applied to transmit-destination computers, and the search is repeated in these transmit-destination computers.

The number of transmit-destination computers to which one transmit-source computer (a transmit-source computer may also be a transmit-destination computer) transmits the divided address lists and search command depends upon the number of divisions of the address list (the divided address list). By setting the number of divisions to an appropriate value, the processing load upon the transmit-source computer (transmit-destination computer) can be alleviated. Even if the number of transmit-destination computers increases, processing time can be shortened.

When digital content such as image data or voice data has been stored in the above-described computer apparatus and transmit-destination computers, a command for searching for a computer in which desired digital content has been stored would be transmitted to a transmit-destination computer. If the computer apparatus in which the desired digital content has been stored is found, then a command for acquiring the desired digital content is transmitted to this computer apparatus from the transmit-source computer. Of course, the search command and the acquisition command may be transmitted together from the transmit-source computer to the transmit-destination computer. This means that the desired digital content can be acquired without again transmitting an acquisition command to the computer apparatus storing the desired digital content.

Further, it may be so arranged that some digital content (thumbnail image data if the digital content is image data, data indicative of a musical fragment if the digital content is music data, etc.) is transmitted to the transmit-source computer in accordance with a search command and acquisition command.

A transmit-destination computer accessible by the transmit-source computer may be decided in advance, and this may be managed in a center server. In such case the transmit-source computer would execute authentication processing when it accesses the center server, and an address list containing addresses of computers accessible by this transmit-source computer would be transmitted from the center server to the transmit-source computer. A system in which digital content can be shared and searched by a specific plurality of computers can be constructed.

A command transmitted from the transmit-source computer to a transmit-destination computer may be a search command concerning services capable of being processed by the transmit-destination computer. By finding a transmit-destination computer, which can process a specific service, in accordance with this search command, a command that is for the purpose of having this service processed can be transmitted to the transmit-destination computer found. For example, if the service is a print service, an image can be printed by transmitting image data representing the image to be printed and a command for printing the image to the transmit-destination computer found. This means that an image can be printed even if a transmit-destination computer that is capable of printing the image is not known to the user.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
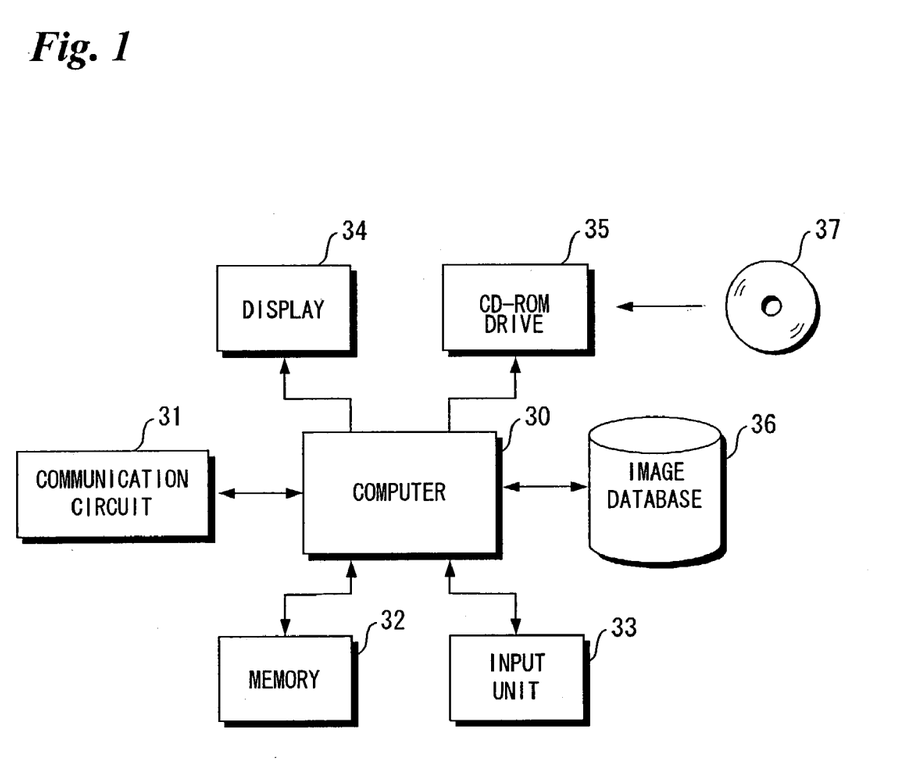
FIG. 1 is a block diagram illustrating the electrical structure of a server.

FIG. 1 is a block diagram illustrating the electrical structure of a server (center server, master server and slave server) constructing a search system according to the present invention. A client computer described later also has a similar structure.

The server includes a computer 30. The latter includes a communication circuit 31 for sending and receiving data and commands, etc., to and from other servers; a memory 32 for storing data temporarily; an input unit 33 for applying commands and the like to the computer 30; a display unit 34; and an image database 36. Image data representing images (original images) of a number of frames and thumbnail image data representing thumbnail images of a number of frames has been stored in the image database 36.

The server further includes a CD-ROM (compact disk-read-only memory) driver 35. A CD-ROM 37 containing a program for executing an operation described later is accessed by the CD-ROM drive 35. The program read from the CD-ROM 37 is installed in the computer 30.

Figure 2:
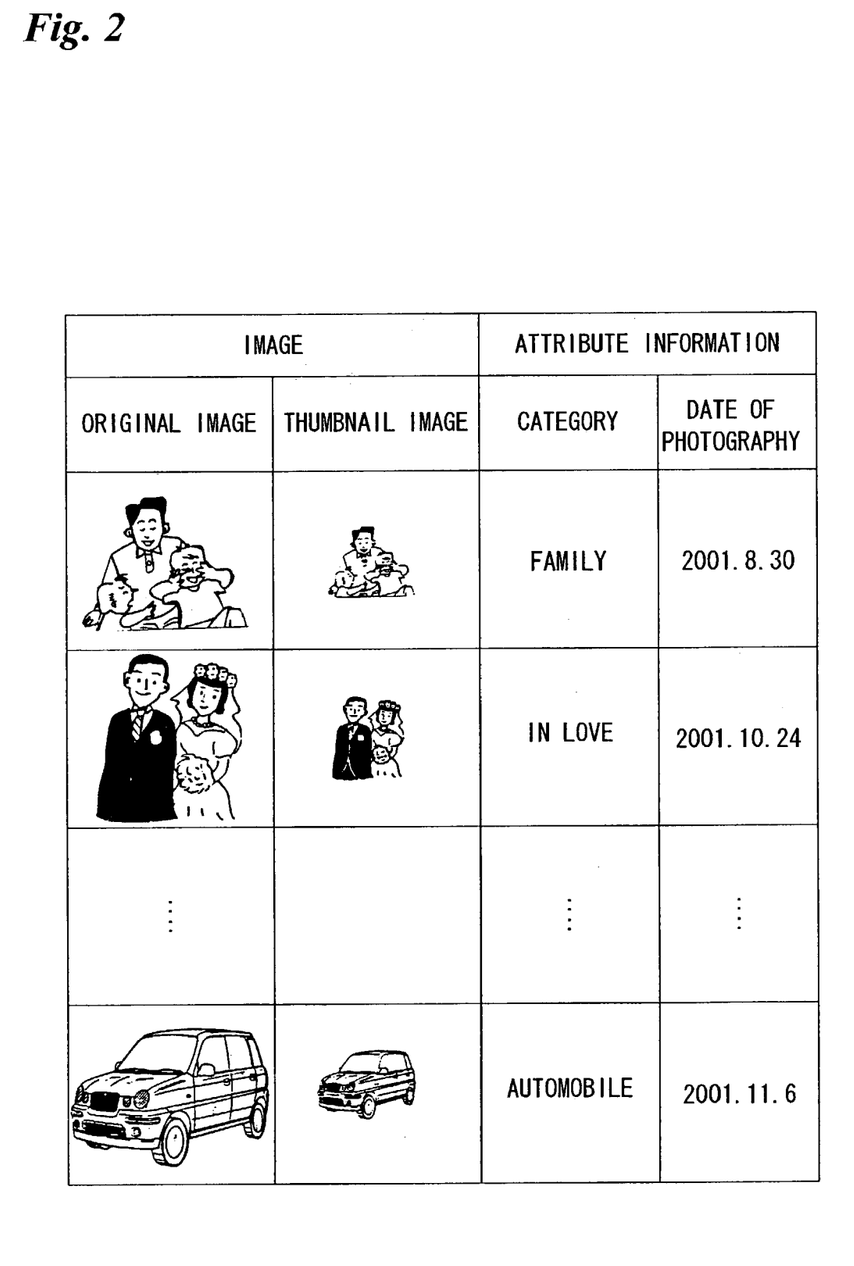
FIG. 2 illustrates an example of images and attribute information stored in an image database.

FIG. 2 illustrates an example of original images and thumbnail images that have been stored in the image database 36.

Appended to the original images and thumbnail images corresponding to the original images stored in the image database 36 is attribute information indicating the category of each image and the date of photography thereof. By applying at least one item of attribute information consisting of category and date of photography, the corresponding original image and its thumbnail are retrieved.

Figure 3:
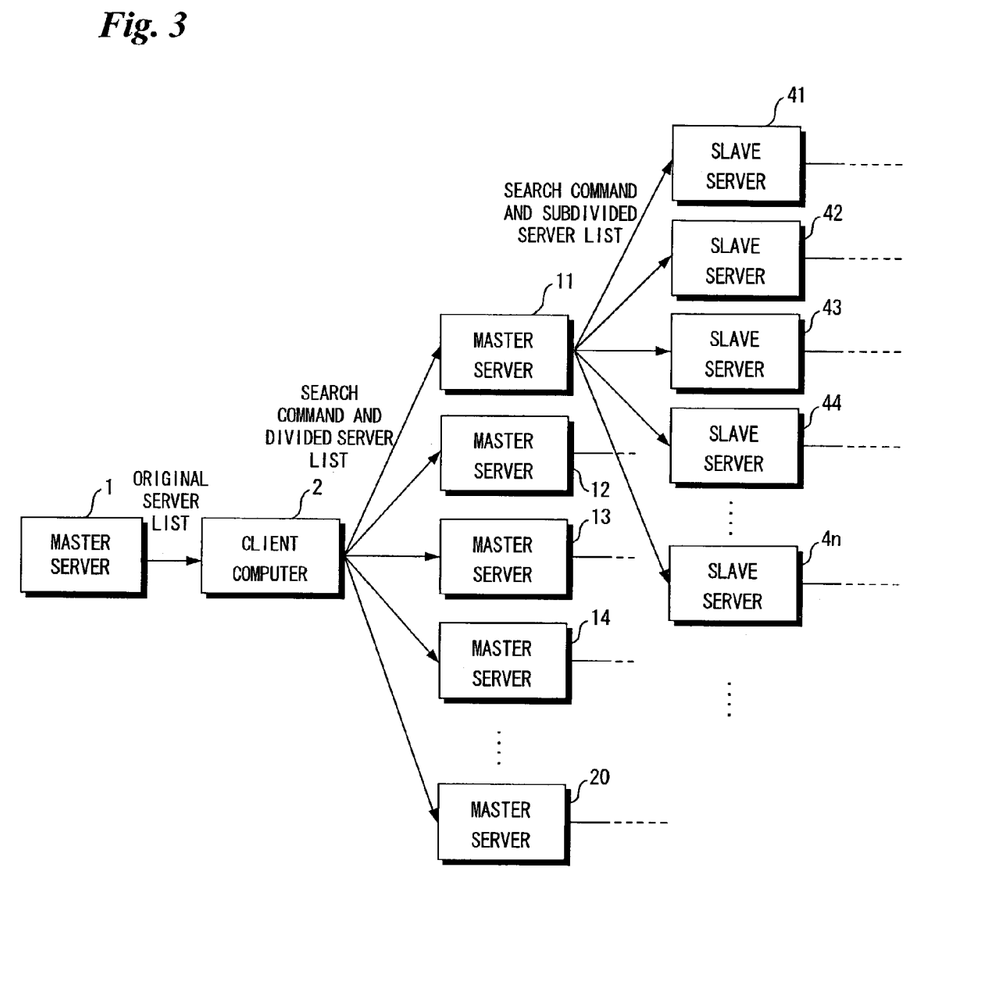
FIG. 3 illustrates an overview of a search system.

FIG. 3 illustrates an overview of a search system.

The search system includes a number of servers that are capable of communicating with one another via a network (not shown). Image data representing images of a number of frames have been stored in each of the number of servers in the manner described above. This search system is for finding a desired image from among such a large number of images.

A center server 1 includes an original server list.

Figure 4:
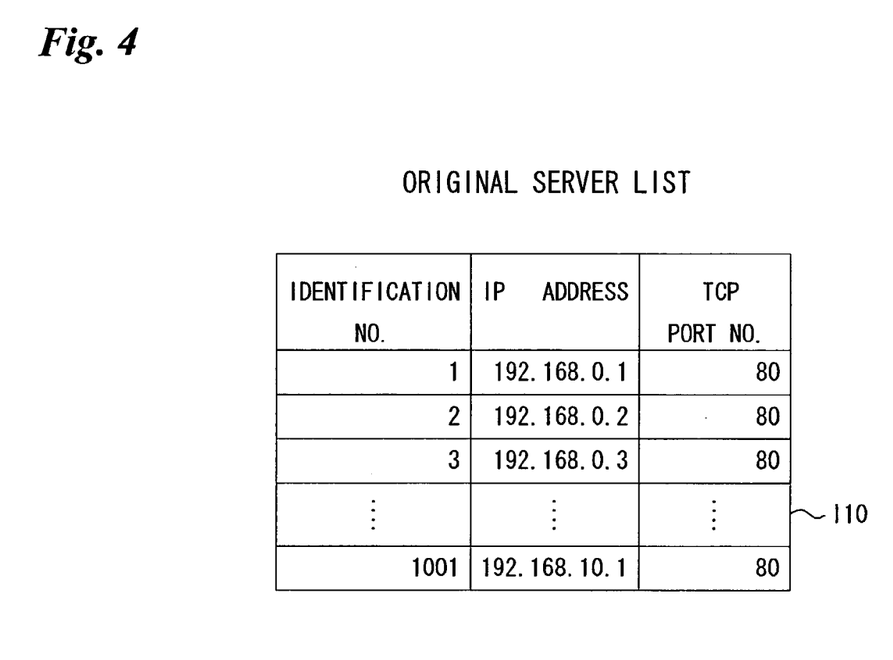
FIG. 4 illustrates an example of an original server list.

FIG. 4 illustrates an example of an original server list.

The original server list 110 stores, in association with identification numbers, IP (Internet Protocol) addresses of a number of servers included in the search system and a TCP (Transmission Control Protocol) port number.

The original server list 110 is transmitted from the center server 1 to a client computer 2 in response to a request from the client computer 2. The latter divides the original server list 110 into a plurality (ten in this embodiment) of server lists, thereby generating divided server lists.

Figure 5:
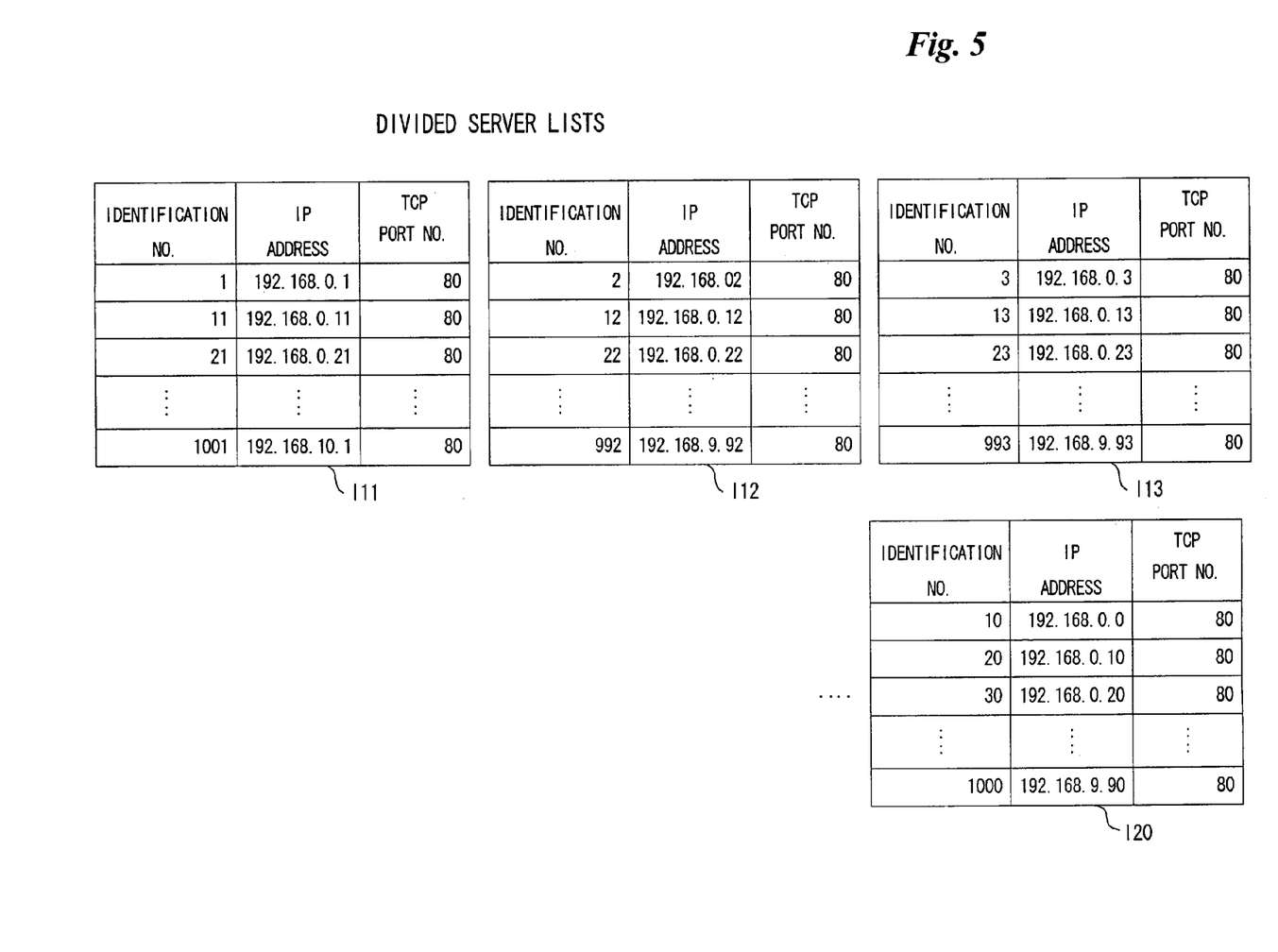
FIG. 5 illustrates an example of divided server lists.

FIG. 5 illustrates an example of the divided server lists.

The client computer 2 divides the original server list 110 into ten server lists, as mentioned above, thereby generating divided server lists 111 to 120.

IP addresses are included in each of the divided server lists 111 to 120 that have been generated. To a server (which shall be referred to as the master server) having an IP address among these IP addresses that corresponds to the smallest identification number (though it goes without saying that the number may be other than the smallest) in each divided server list, the corresponding divided server list and a search command are transmitted.

In this embodiment, the smallest identification number in the divided server list 111 is "1", and the corresponding IP address is "192.168.0.1". Accordingly, the divided server list 111 and the search command are transmitted from the client computer 2 to a master server 11, which has "192.168.0.1" as its IP address. Similarly, since the smallest identification number in the divided server list 112 is "2", the divided server list 112 is transmitted to a master server 12 having "192.168.0.2" as its IP address. The divided server lists 113 to 120 are transmitted to master servers 13 to 20, respectively, in similar fashion.

The master servers 11 to 20 respond to the search command by determining whether the relevant image data exists.

The divided server lists 111 to 120 are further divided (i.e., subdivided) by respective ones of the master servers 11 to 20, whereby subdivided server lists are generated. As in the manner of the divided server lists, the subdivided server lists that have been generated are transmitted together with the search command to servers (which shall be referred to as slave servers) having IP addresses corresponding to the smallest identification numbers among the IP addresses contained in respective ones of the subdivided server lists. Among the IP addresses, TCP port addresses and identification numbers contained in a subdivided server list, those that correspond to the IP address of the master server that received the list are deleted by the master server itself. Of course, it goes without saying that an arrangement may be adopted in which the deletion is made by the slave server at the destination of transmission.

By way of example, the divided server list 111 is subdivided into ten subdivided server lists by master server 11. The ten subdivided server lists are transmitted to corresponding ones of slave servers 41 to 50 together with the search command, and the slave servers 41 to 50 conduct a search in accordance with the search command. The slave servers 41 to 50 also subdivide their subdivided server lists and transmit the resulting lists to other servers together with the search command. Each slave server also deletes its own IP address, TCP port number and identification number from its subdivided server list.

The division of the server list into divided server lists and the transmission of the divided server lists is thus repeated. When the server list can no longer be divided, the division of the server list and the transmission of divided server lists ends. Of course, the dividing and transmitting operations may be halted at a suitable time without repeating them until the server list can no longer be divided.

Each server conducts a search in accordance with the search command, and data indicative of the search result is sent back to the transmission-source server that transmitted the search command. Data indicative of all of the results of the search is thus transmitted to the client computer 2. The latter then recognizes the IP address of the server at which the desired image has been stored as well as the ID of this image. The client computer 2 then sends the server where the desired image has been stored an acquisition command for acquiring the image having the image ID. The server that receives the acquisition command transmits the image data to the client computer 2.

A large number of servers can be made to execute search processing without increasing the load on each individual server. Further, even if servers and IP addresses are not in one-to-one correspondence owing to a change in IP address, as in a DHCP (Dynamic Host Configuration Protocol), a large number of servers can be made to execute search processing.

Figure 6:
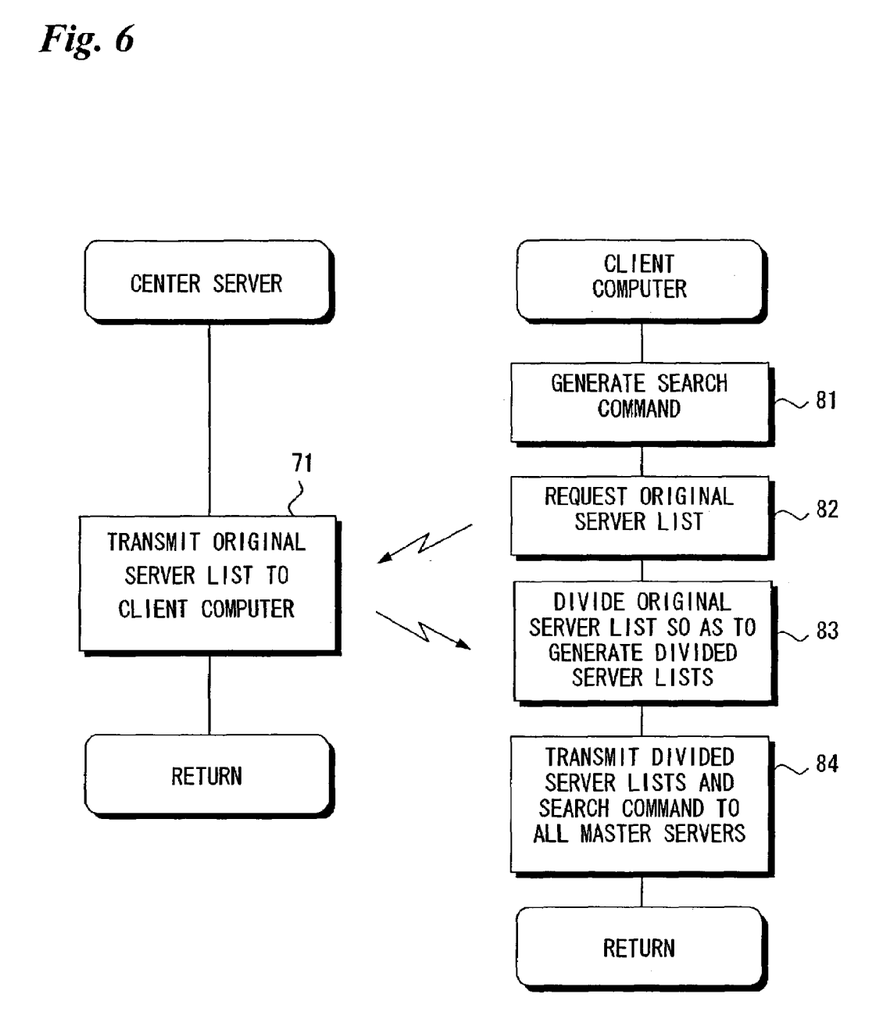
FIG. 6 is a flowchart illustrating processing executed by a center server and processing executed by a client computer.

FIG. 6 is a flowchart illustrating processing executed by the center server 1 and processing executed by the client computer 2.

The client computer 2 generates a search command (step 81). For example, if the search command is to "SEARCH FOR A LOCATION WHERE AN IMAGE IN THE 'LOVE' CATEGORY EXISTS, AS WELL AS THE ID OF THIS IMAGE", then the search command will be "SELECT LOCATION, ID WHERE CATEGORY='LOVE'". The client computer 2 then provides the center server 1 with a request to transmit the original server list (step 82).

The center server 1 responds to the transmit request by transmitting the above-described original server list to the center server 1 (step 71).

Upon receiving the original server list, the client computer 2 divides the original server list to generate the plurality of divided server lists described above (step 83). The client computer 2 then transmits the plurality of subdivided server lists generated and the generated search command to respective ones of the corresponding master servers 11 to 20 in the manner set forth above (step 84).

Figure 7:
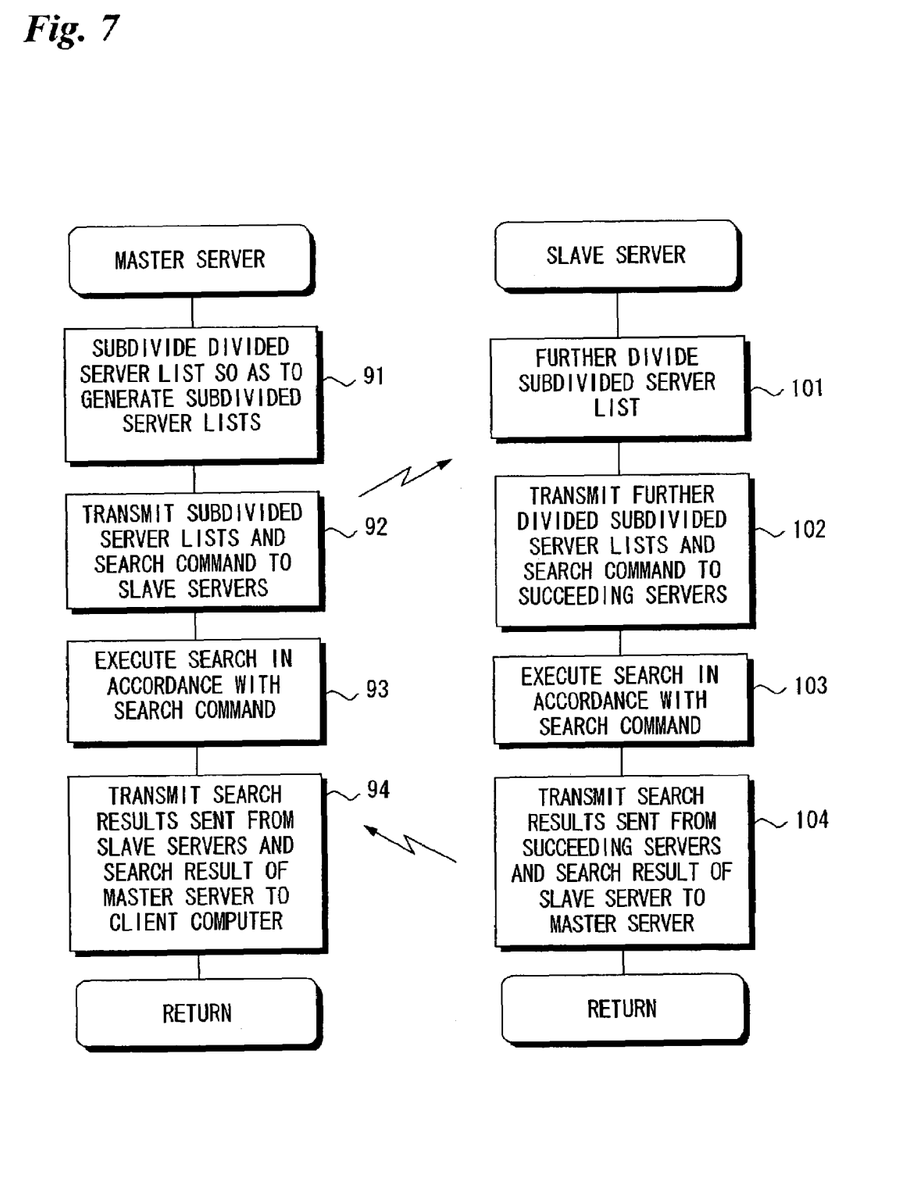
FIG. 7 is a flowchart illustrating processing executed by a master server and processing executed by a slave server.

FIG. 7 is a flowchart illustrating processing executed mainly by a master server and a slave server.

Upon receiving a divided list transmitted from the client computer 2, a master server further divides this list to thereby generate subdivided server lists (step 91). The subdivided server lists generated and the search command are transmitted to the slave servers (step 92) in the manner described above. Further, in accordance with the search command that has been received, the master server conducts an image search (a search to determine whether an image having "LOVE" as its category has been stored in the image database) (step 93).

Upon receiving the subdivided server list and search command transmitted from the master server, the slave server further subdivides the subdivided server list (step 101) in the manner described above. The subdivided server lists thus further subdivided and the search command are transmitted from this slave server to succeeding servers (step 102) in the manner described above. These succeeding servers further subdivide the server lists and execute image search processing in accordance with the search command. Such division of the server list, search processing and re-sending of the subdivided server lists are repeated.

The slave server executes search processing in accordance with the search command it has received (step 103).

When the search is conducted by a successive server to which a subdivided server list and search command have been transmitted from the slave server, data indicative of a search result is transmitted from this successive server to the slave server that was the transmission source. When this is done, the received data indicative of the search result and the result of search processing executed by the slave server itself are transmitted from the slave server to the master server that was the transmission source of the subdivided server list and search command (step 104).

When the data indicative of the search result transmitted from the slave server is received by the master server, the latter transmits this data together with the result of search processing executed by the master server itself to the client computer 2 (step 94).

Thus, the result of the search for the image that has been stored in the server having the IP address contained in the original server list is recognized by the client computer 2. The client computer 2 thenceforth transmits an acquisition command to the server at which the desired image has been stored. As a result of the acquisition command being received by the corresponding server, the image data is transmitted from this server to the client computer 2. For example, an acquisition command that applies a request for transmission of thumbnail image data whose ID is "001" to a server having an IP address of "192.168.1.2" and a port number of "80" is "SELECT IMAGE AS THUMBNAIL WHERE LOCATION='192.168.1.2:80' ID=001;".

In the above embodiment, the terms "center server", "client computer", "master server" and "slave server", etc., are used in order to facilitate an understanding of the invention. However, it goes without saying that all servers and client computers implement any of these roles.

Further, a client computer capable of accessing a server may be decided on a per-client-computer basis. This means that when a request to transmit an original server list is sent from a client computer to the center server, an original server list regarding a server capable of being accessed by this client computer is transmitted and the above-described search processing is executed. As a result, specific users of client computers can share and search images.

Furthermore, though the foregoing embodiment regards the searching of image data, the invention can be applied to other processing by changing the command. For example, the invention can be applied to a system that searches for desired processing among types of processing (services) that can be executed by a server. Processing for printing an image is one example of such processing. Assume that the above-mentioned search command is one for finding a server that is capable of image print processing. By transmitting image data representing an image to be printed as well as a print command to the server found, the desired server can be made to print the image.

As many apparently widely different embodiments of the present invention can be made without departing from the spirit and scope thereof, it is to be understood that the invention is not limited to the specific embodiments thereof except as defined in the appended claims.

What is claimed is:

1. A computer apparatus comprising:
   a first receiving device for receiving an original address list transmitted from a center server and containing addresses of a number of computers;
   a dividing device for dividing up the original address list, which has been received by said first receiving device, into divided address lists corresponding to respective ones of a plurality of computers;
   a first transmitting device for transmitting a divided address list obtained by said dividing device as well as a search command to a transmit-destination computer specified by an address contained in this divided address list; and
   a second receiving device for receiving data representing result of execution of search processing by said transmit-destination computer in accordance with the search command.

2. A computer apparatus comprising:
   a first receiving device for receiving an address list, which contains addresses of respective ones of a number of computers, and a search command, the address list and command being provided by a transmit-source computer;
   a dividing device for dividing up the original address list, which has been received by said first receiving device, into divided address lists corresponding to respective ones of a plurality of computers;
   a first transmitting device for transmitting a divided address list obtained by said dividing device as well as a search command to a transmit-destination computer specified by an address contained in this divided address list;
   a search device for conducting a search in accordance with a search command received by said first transmitting device;
   a second receiving device for receiving data representing result of execution of search processing by said transmit-destination computer in accordance with the search command; and
   a second transmitting device for transmitting, to said transmit-source computer, data representing result of execution of search processing by said search device and data representing result of execution of search processing received by said second receiving device.

3. A program for controlling a computer apparatus so as to:
   receive an address list, which contains addresses of respective ones of a number of computers, and a search command, the address list and command being provided by a transmit-source computer;
   divide up the received original address list into divided address lists corresponding to respective ones of a plurality of computers;

transmit a divided address list as well as a search command to a transmit-destination computer specified by an address contained in this divided address list;
conduct a search in accordance with a search command received;
receive data representing result of execution of search processing by the transmit-destination computer in accordance with the search command; and transmit, to the transmit-source computer, data representing result of execution of search processing received and data representing result of a search conducted in accordance with the search command.

* * * * *